(12) United States Patent
Chou

(10) Patent No.: US 7,397,645 B2
(45) Date of Patent: Jul. 8, 2008

(54) POWER SUPPLY TRANSMISSION CORD

(75) Inventor: Ching-Ling Chou, Taipei Hsien (TW)

(73) Assignee: Topower Computer Industrial Co., Ltd., Taipei Hsien (TW)

( * ) Notice: Subject to any disclaimer, the term of this patent is extended or adjusted under 35 U.S.C. 154(b) by 0 days.

(21) Appl. No.: 11/347,377

(22) Filed: Feb. 6, 2006

(65) Prior Publication Data

US 2006/0126251 A1   Jun. 15, 2006

Related U.S. Application Data

(63) Continuation of application No. 11/118,319, filed on May 2, 2005, now abandoned.

(30) Foreign Application Priority Data

May 14, 2004  (CN) .................. 2004 2 0022724

(51) Int. Cl.
*H02H 3/22* (2006.01)
*H02H 1/00* (2006.01)

(52) U.S. Cl. ..................................... 361/111

(58) Field of Classification Search ................. 361/111
See application file for complete search history.

(56) References Cited

U.S. PATENT DOCUMENTS

| | | | |
|---|---|---|---|
| 3,390,357 A * | 6/1968 | Thomson ................ 333/17.1 |
| 4,292,195 A | 9/1981 | Morris | |
| 4,386,819 A | 6/1983 | Asick et al. | |
| 4,399,419 A | 8/1983 | Dobrovolny | |
| 4,723,115 A * | 2/1988 | Apter .................. 333/181 |
| 5,095,291 A * | 3/1992 | Staschover et al. ......... 333/12 |
| 5,113,159 A | 5/1992 | Adriaenssens et al. | |
| 5,287,074 A | 2/1994 | Meguro et al. | |
| 5,763,825 A | 6/1998 | Gilliland | |
| 5,818,705 A * | 10/1998 | Faulk .................. 363/48 |
| 5,939,668 A | 8/1999 | De Win | |
| 6,054,649 A | 4/2000 | Uchida et al. | |
| 6,395,977 B1 * | 5/2002 | Yamamoto .............. 174/36 |
| 6,433,984 B1 * | 8/2002 | Cherniski .............. 361/111 |
| 6,703,558 B2 | 3/2004 | Uang | |
| 6,706,965 B2 | 3/2004 | Kato et al. | |
| 6,867,362 B2 | 3/2005 | Cherniski et al. | |
| 2002/0177357 A1 | 11/2002 | Inui | |
| 2003/0090340 A1 * | 5/2003 | Chen .................. 333/185 |

FOREIGN PATENT DOCUMENTS

| | | |
|---|---|---|
| DE | 4032421 | 4/1992 |
| EP | 0 220 140 A2 | 4/1987 |
| JP | 2004288069 A * | 10/2004 |

* cited by examiner

*Primary Examiner*—Ronald W Leja
(74) *Attorney, Agent, or Firm*—Apex Juris, pllc; Tracy M Heims

(57) ABSTRACT

A power supply transmission cord to filter out high frequency noises, ripples and noises between a power supply and the connecting peripheral devices such as a VGA card, HDD, RAM, CDROM, DVD and the like. A metal member is provided to surround the transmission cord to filter out the high frequency noises, and a condenser is provided to connect two conductive wires to filter out the ripples and noises.

6 Claims, 5 Drawing Sheets

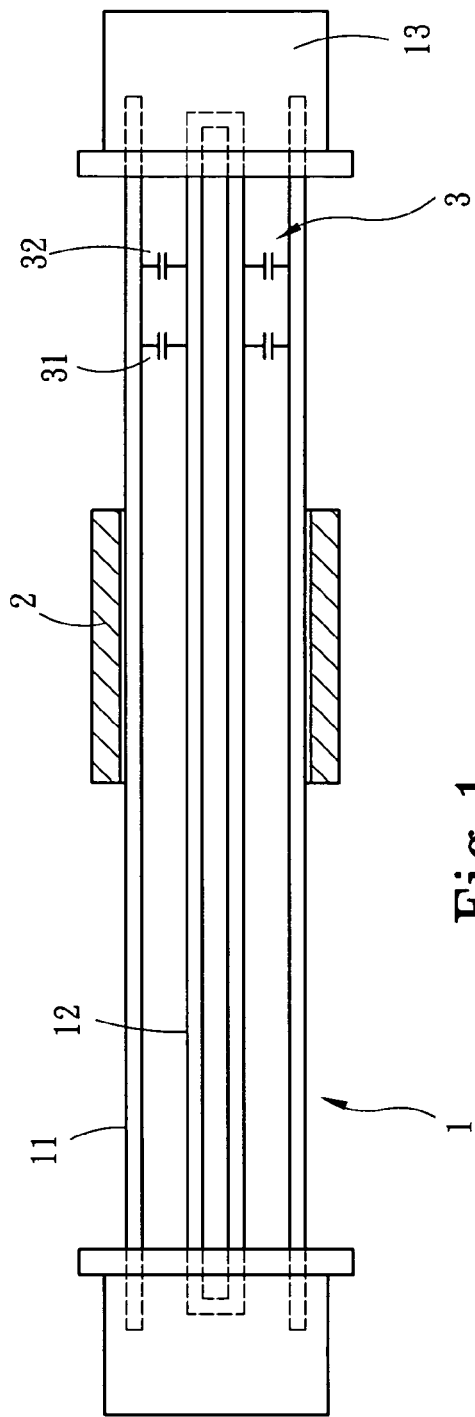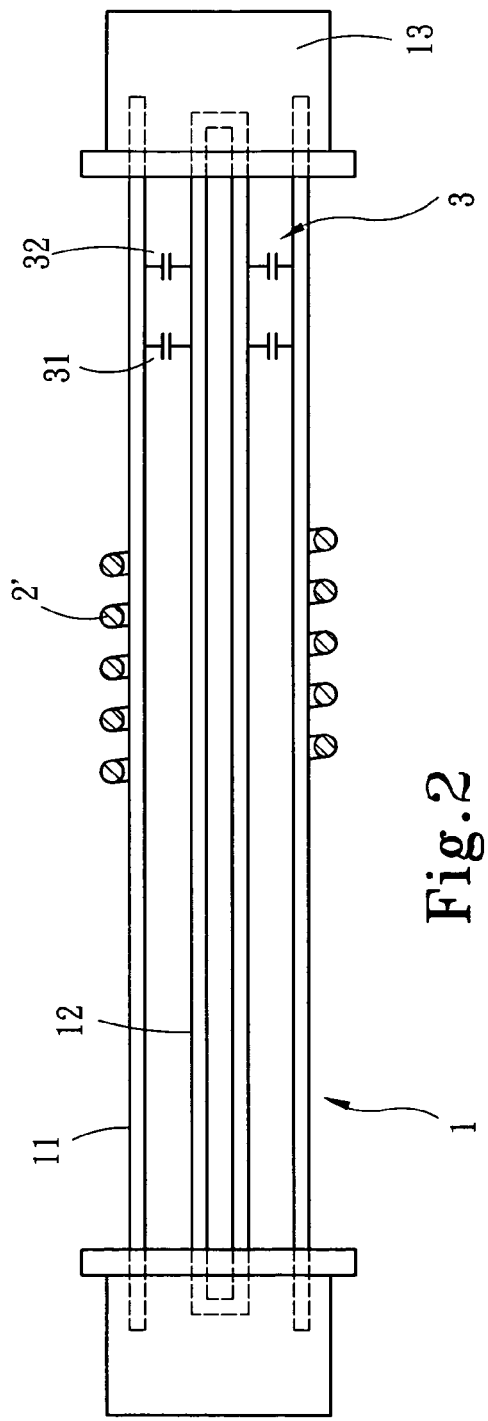

– 1 –

POWER SUPPLY TRANSMISSION CORD

This application is a Continuation Application, and claims priority, of from U.S. patent application Ser. No. 11/118,319 filed on May 2, 2005, now abandoned, entitled "Improved power supply transmission cord".

FIELD OF THE INVENTION

The present invention relates to a power supply transmission cord adopted for use between a power supply and peripheral devices such as VGA cards, HDD, RAM, CDROM, DVD and the like that has a condenser to filter out ripples and noises.

BACKGROUND OF THE INVENTION

The power supply in a computer is connected to other peripheral devices such as VGA cards, HDD, RAM, CDROM, DVD and the like through a power supply transmission cord to deliver electric power. The stability of the transmission cord is very important. When the power supply delivers electric power, ripples and noises often occur. On the other hand, signal transmission of the VGA card generates high frequency noises. The power supply transmission cords now on the market to connect the power supply of the computer and the peripheral devices such as the VGA cards, HDD, RAM, CDROM, DVD and the like do not have any apparatus to filter out high frequency noises and ripples and other noises. As a result, the screen often has undesirable display such as snow flakes or skewed lines. This could shorten the life span of the peripheral devices such as the VGA cards, HDD, RAM, CDROM, DVD and the screen. Display quality of the screen also is affected.

SUMMARY OF THE INVENTION

The aforesaid problem remains unsolved heretofore. Moreover, due to rapid growth of online games and computer games, demands for high-end VGA and high speed and large capacity HDD increase constantly, an improved power supply transmission cord is urgently needed to overcome the problem mentioned above.

Therefore the primary object of the invention is to provide an improved power supply transmission cord that has a condenser between two conductive wires of the power supply transmission cord that links the power supply and peripheral devices such as VGA cards, HDD, RAM, CDROM, DVD and the like to filter out ripples and noises.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 1 is a sectional view of an embodiment of the invention.

FIG. 2 is a sectional view of another embodiment of the invention.

DETAILED DESCRIPTION OF THE PREFERRED EMBODIMENTS

Figure 3:
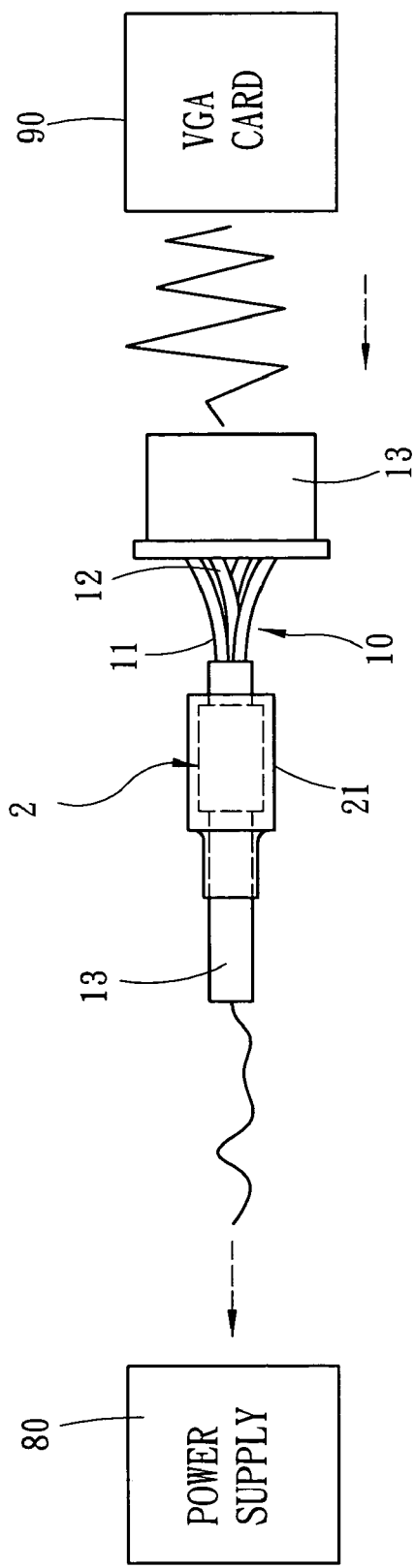
FIG. 3 is a schematic view of the invention in a use condition and a result comparison.
Figure 4:
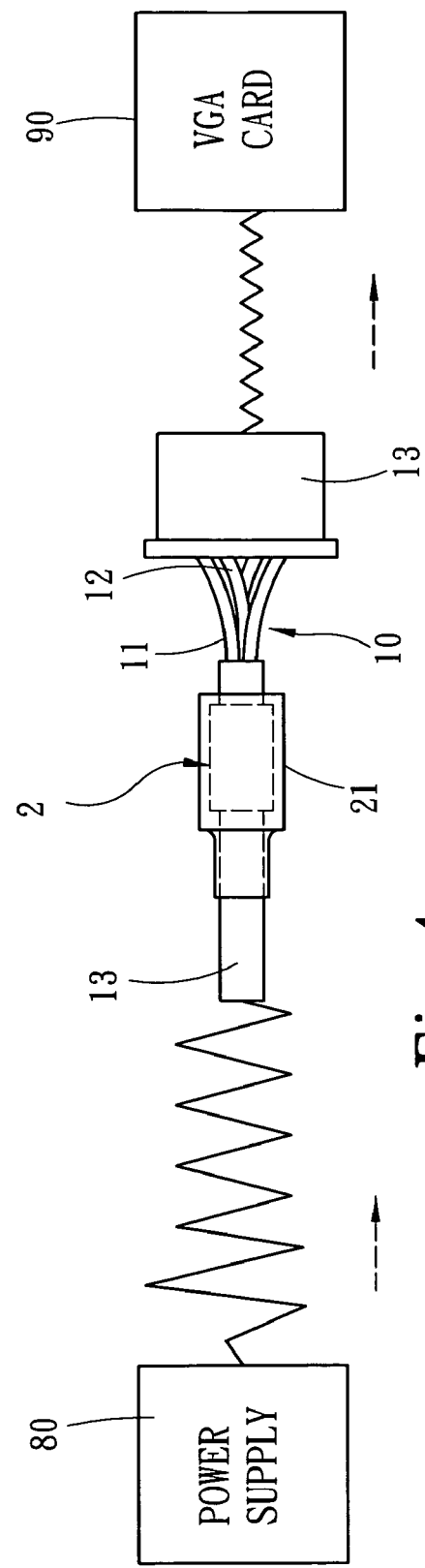
FIG. 4 is a schematic view of the invention in another use condition and a result comparison.
Figure 5:
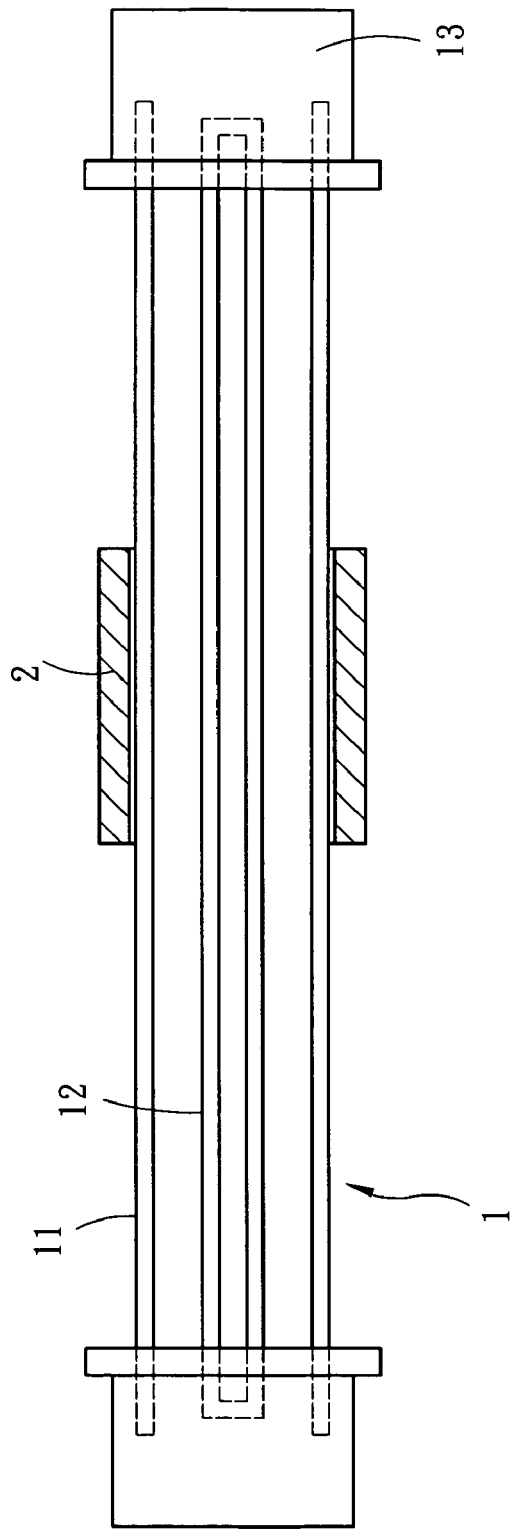
FIG. 5 is a schematic view of yet another embodiment of the invention.
Figure 6:
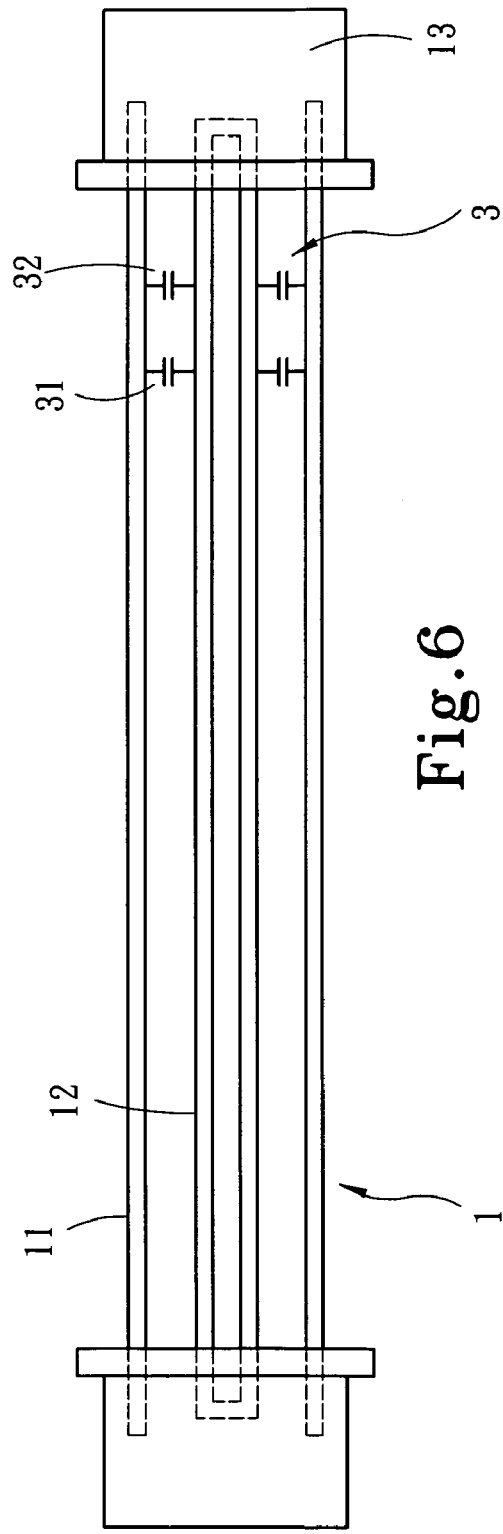
FIG. 6 is a schematic view of still another embodiment of the invention.
Figure 7:
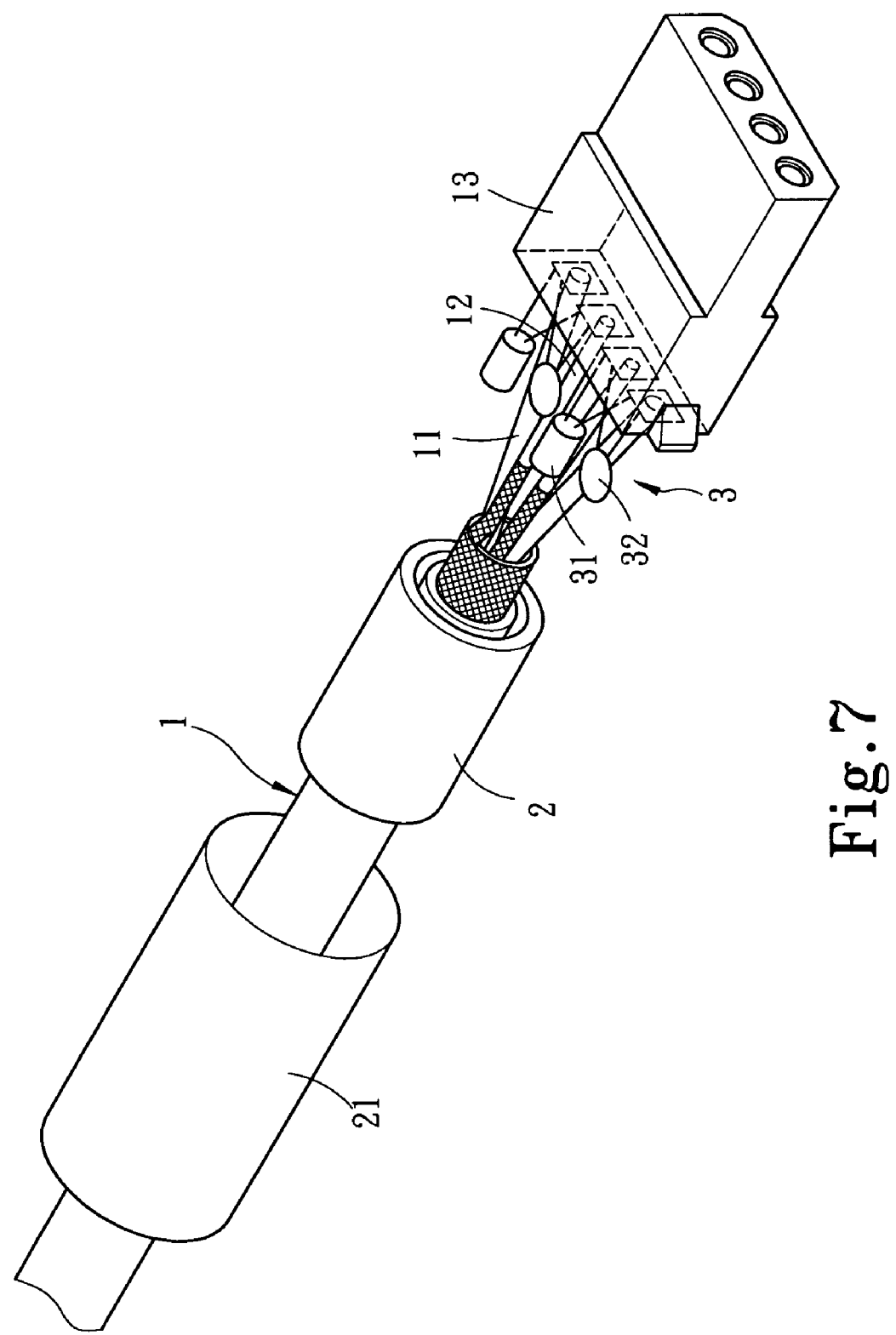
FIG. 7 is a schematic view of the invention adopted on a power supply transmission cord of a single-layer connection terminal.
Figure 8:
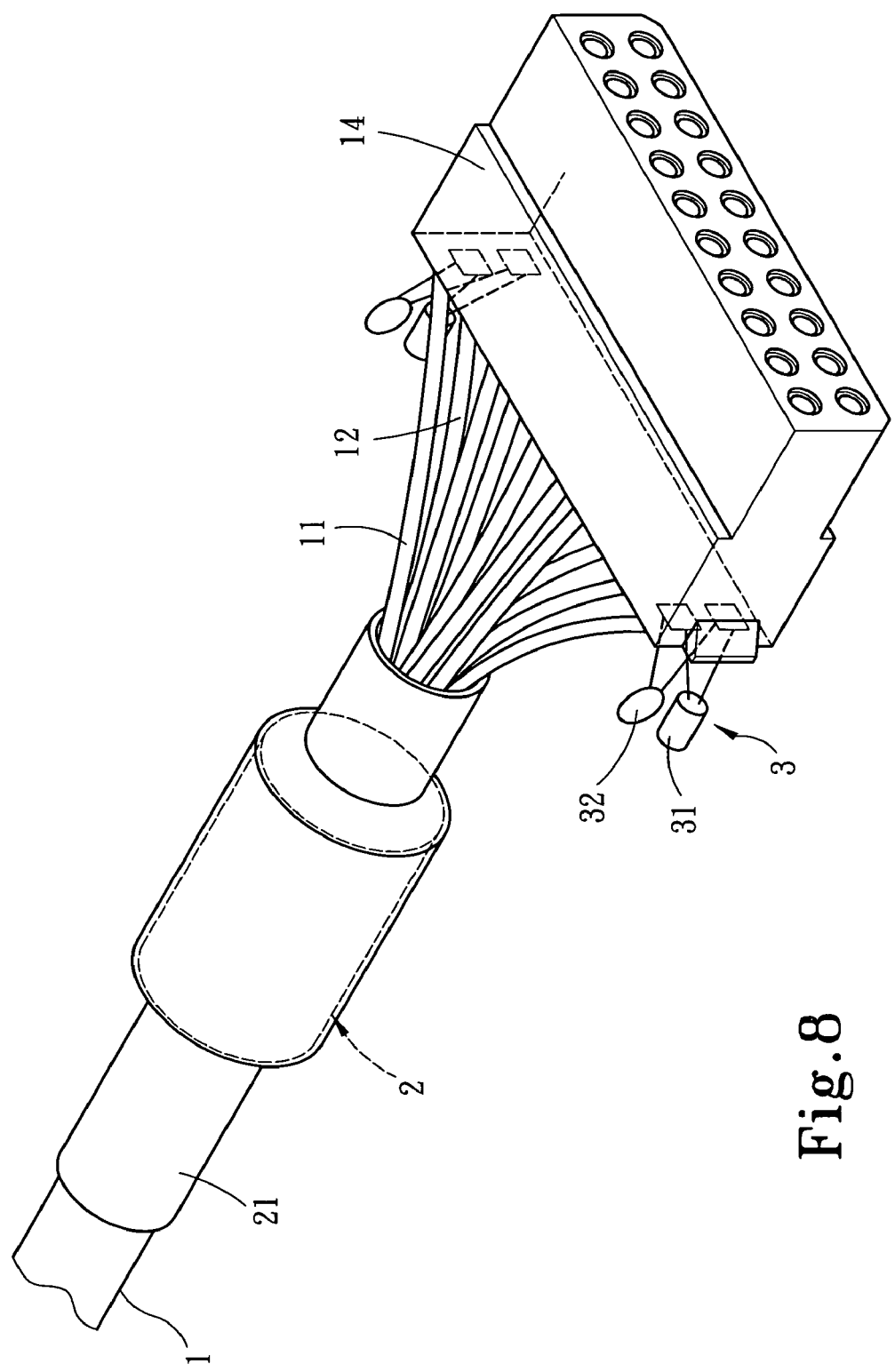
FIG. 8 is a schematic view of the invention adopted on a power supply transmission cord of a double-layer connection terminal.

Please refer to FIGS. 1 and 2, the power supply transmission cord 1 according to the invention mainly aims to connect a power supply 80 to peripheral devices such as a VGA card 90, HDD, RAM, CDROM, DVD and the like. The power supply transmission cord 1 has a metal member 2 to filter out high frequency noises and a condenser 3 to filter out ripples and noises. The power supply transmission cord 1 includes at least two conductive wires 11 and 12 and a coupling terminal 13 on one end of the conductive wires 11 and 12. The condenser 3 is electrically connected to the conductive wires 11 and 12 close to the coupling terminal 13 (the number of the conductive wires 11 and 12 depends on the specification of the power supply transmission cord 1. The coupling terminal 13 may be a single-layer coupling terminal 13 as shown in FIG. 7, or a double-layer coupling terminal 14 as shown in FIG. 8 according to the specification of the power supply transmission cord 1). The metal member 2 may be a hub formed by a metal sheet or a winding metal coil 2' (as shown in FIG. 2) to cover the power supply transmission cord 1, and encased and anchored by an insulation member 21 to filter out the high frequency noises. The condenser 3 consists of an electrolytic condenser 31 and a ceramic condenser 32 to filter out the ripples and noises. Refer to FIGS. 3 and 4 for the invention in use and the comparison of results being generated. The power supply 80 delivers electric power to the VGA card 90, HDD, RAM, CDROM, DVD and the like through the power supply transmission cord 1. The ripples and noises generated during electric power transmission are filtered out by the condenser 3 located between the two conductive wires 11 and 12 so that power supply is more stable (as shown in FIG. 4). On the other hand, the high frequency noises generated by the peripheral devices such as the VGA card 90, HDD, RAM, CDROM, DVD and the like and transmitted to the power supply 80 are filtered out by the metal member 2. Therefore power supply quality of the power supply 80 and display quality of the peripheral devices such as the VGA card 90, HDD, RAM, CDROM, DVD and the like improve. Undesirable display phenomenon such as snow flakes or skewed lines also can be prevented on the peripheral devices such as the VGA card 90, HDD, RAM, CDROM, DVD and the like. The life span of the peripheral devices such as the VGA card 90, HDD, RAM, CDROM, DVD and the like also increases, and the display quality of the screen is enhanced.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power supply transmission cord for a personal computer comprising at least two conductive wires and a condenser that connects the at least two conductive wires to filter ripples and noises generated from a power supply to peripheral devices that include a VGA card, a HDD, a RAM, a CDROM and a DVD and at least one coupling terminal on one end of the at least two conductive wires, the condenser electrically connecting the conductive wires and the coupling terminal, and at least one short metal member on an outer side to filter out high frequency noises generated by said peripheral devices wherein the metal member only covers the transmission cord on a small portion of the length of the cord.

2. The power supply transmission cord of claim 1, wherein the condenser consists of an electrolytic condenser and a ceramic condenser.

3. The power supply transmission cord of claim 1, wherein the metal member is a hub formed by a metal sheet.

4. The power supply transmission cord of claim 1, wherein the metal member is a winding metal coil.

5. The power supply transmission cord of claim 1, wherein the power supply transmission cord has a one-layer connection terminal.

6. The power supply transmission cord of claim 1, wherein the power supply transmission cord has a double-layer connection terminal.

* * * * *